S. P. RUGGLES.
SHEARS FOR CUTTING BANK NOTES, PAPER, &c.
No. 19,046. Patented Jan. 5, 1858.
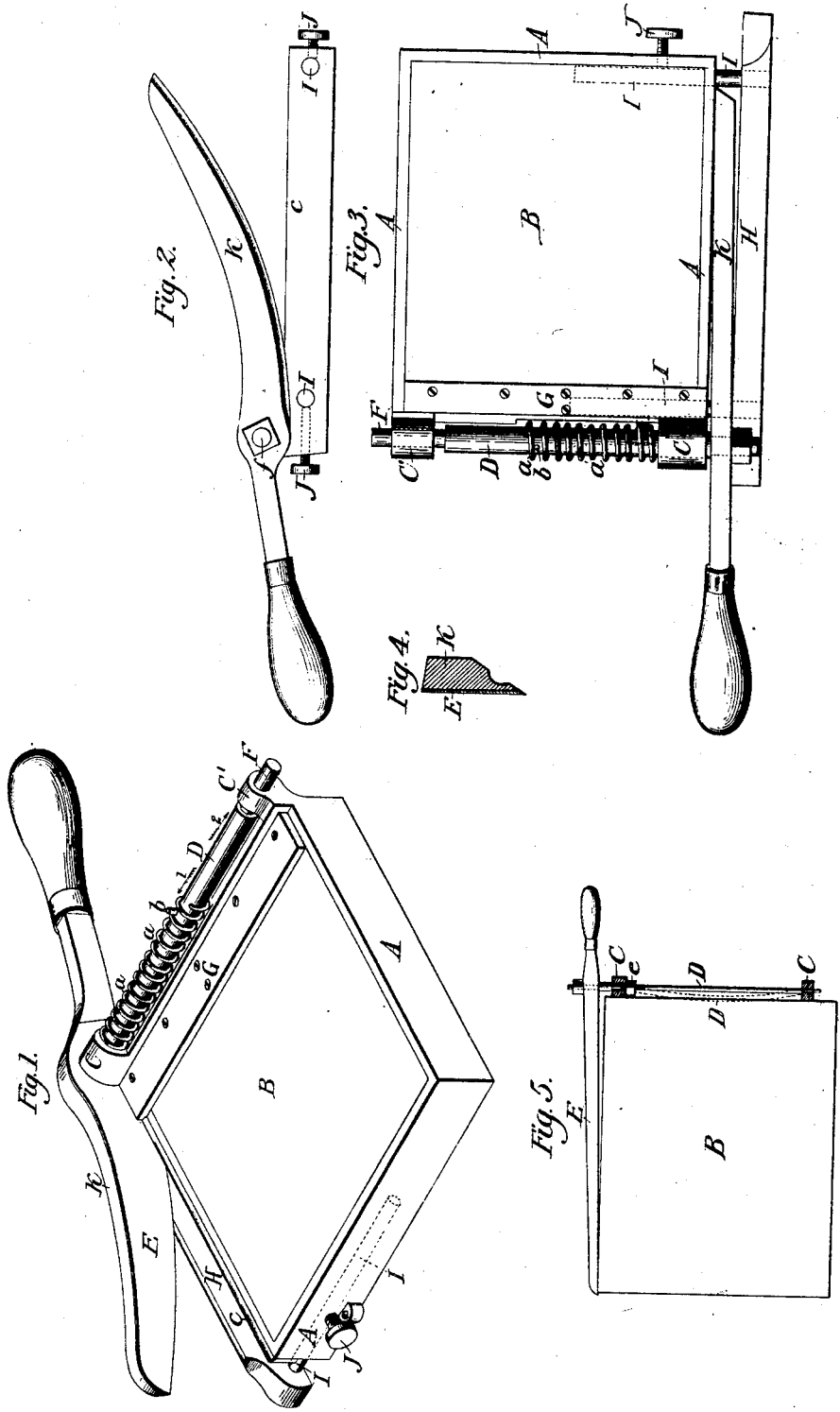

UNITED STATES PATENT OFFICE.

STEPHEN P. RUGGLES, OF BOSTON, MASSACHUSETTS.

SHEARS FOR CUTTING BANK-NOTES, &c.

Specification of Letters Patent No. 19,046, dated January 5, 1858.

*To all whom it may concern.*

Be it known that I, STEPHEN P. RUGGLES, of Boston, in the county of Suffolk and State of Massachusetts, have invented certain new and useful Improvements in Vibrating Shears for Cutting Bank-Notes, Paper, or other Material; and I do hereby declare the following to be a full, clear, and exact description of the same, reference being had to the accompanying drawings, making a part of this specification, in which—

Figure 1 represents a perspective view of the shears, with the movable blade, raised. Fig. 2 represents a side view. Fig. 3 represents a top plan. Fig. 4 represents a section through the movable blade, to show its form. Fig. 5 represents a modification of the general plan, which will be specially referred to.

Similar letters of reference, where they occur in the several figures, denote like parts of the shears in all of them.

The nature of my invention consists, in so hanging the movable blade of a pair of shears, as that, in the act of cutting it shall continue to be drawn close up to the stationary blade throughout its whole length, but without allowing the cutting edges, to shear each other, and at the same time spread at their heels uncontrolled by a tight rivet or screw as heretofore done.

To enable others skilled in the art to make and use my invention, I will proceed to describe the same with reference to the drawings.

A, represents a rectangular metallic frame, in which is set a wooden table B. On the rear side of this frame A, are two lugs, or bearings C, C', for supporting a shaft D, to one end of which the movable blade E, is permanently affixed, so that both shall move together. The opposite end of the shaft D, from where the blade E, is affixed, has a journal F, upon it, which slides endwise through its bearing C', when the movable blade is in motion. The shaft D, also, has an end motion in the bearing C, when the blade is worked. A helical spring *a*, is coiled around the shaft D, one end of which bears against the lug C, and the other end is held by a pin *b*, to the shaft D.

G, is a guide or straight edge on the table B, against which the paper, card, or whatever is to be cut, is brought; and H, is another straight edge, at right angles to the one G, and made adjustable by rods I, a set screws J, to determine the width length of the thing or material to be c On that edge of the frame A next the bla E, is placed a thin steel blade *c*, again which the movable blade E acts, to form t shears.

By reference to Fig. 3, it will be seen th when the blade is down, its point is in clo contact with the stationary blade *c*, whi the heel of the movable blade, is remo therefrom. This arises from the peculi manner in which the movable blade is hun When the blade is pressed down in the a of cutting, its tendency is to push itse away from the stationary blade *c*. In doi this the shaft D, moves endwise, in the c rection of the arrow 1, sliding through i bearings, and at the same time compressi the helical spring *a*, and thus the cuttii points of the two blades are kept close t gether, throughout their entire lengt When the movable blade is raised, the rec of the spring *a*, moves the shaft D, back the direction of the arrow 2 through i bearings, thus reversing the operation, b still keeping the cutting points of the tv shearing blades in close contact.

The stock K, of the movable blade quite thick, as seen in Fig. 4, so that tl blade cannot bend, its rigidity being nece sary to the perfect operation of the part and the blade is bowed, or curved, as seen Figs. 1 and 2, to give the same cutting ang all the way from heel to point through tl material that is to be severed. By drawii the two cutting edges of the shears t gether at their cutting points, and conti: uing this throughout their entire length I can use quite long blades with but litt motion of the hand.

In Fig. 5, I have represented a modific tion of the above described plan wherei instead of a separate spring, and end m tion to the shaft D, I make said sha slender enough to be a spring in itself, ar the spring or bowing of this shaft, avoic the necessity of the end motion of the shai while the same end is partially attained : in the first described plan. In this modif cation, the blade E, is secured to the sha D, said shaft turning with the blade, in tl bearings C, C'. In order to get the strai on the shaft D, so as to cause it to act as spring it is necessary first to place the blac (as shown in Fig. 5) with its point, in cor t with the farthest point of the stationr blade. There is then a space between heels or afterparts of said blades, as also wn in the drawing. When in this posin run the nut *e*, up against the lug C, ich will draw the shaft against the other C′, but as the shaft cannot slip endwise, l is delicately made, it will bow out as wn in dotted lines, and in this position tendency to assume a right line again ises it to act as a spring in keeping the vable blade to the fixed one. As the de is raised up, the bent shaft will apach a straight line, until, when comtely up, it becomes perfectly straight, l the forcing of it down again springs curve into it again. To allow the shaft spring, it should be a little loose in the ring C, so as not to be cramped in it. A w thread is cut on the shaft D, for the *e* to run on. Or the shaft in this case, y be made stiff, and the spring made in blade E, which would partially produce the same result, but the blade would then have to be thin, and gradually tapered from heel to point, so as to bend uniformly throughout its entire length. The drawing cut given to the blade, is caused partially by its curved shape, and by the manner of pivoting it above the cutting edge as seen at *f* Fig. 2.

Having thus fully described the nature of my invention, what I claim therein as new and desire to secure by Letters Patent is—

The keeping of the moving blade, in close and equal contact with the stationary one, throughout their entire length, and the allowing of the blades to separate at the heel when in the act of cutting, as herein described, and represented.

STEPHEN P. RUGGLES.

Witnesses:
W. H. SMITH,
G. H. KELLOGG.